United States Patent [19]
Sakamoto

[11] Patent Number: 5,273,705
[45] Date of Patent: Dec. 28, 1993

[54] FILM MOLDING METHOD

[75] Inventor: Yoshio Sakamoto, Hachioji, Japan

[73] Assignee: Kabushiki Kaisha Kenwood, Yamagata, Japan

[21] Appl. No.: 745,262

[22] Filed: Aug. 14, 1991

[30] Foreign Application Priority Data

Aug. 20, 1990 [JP] Japan .................................. 2-216966

[51] Int. Cl.⁵ .............................................. B29C 71/02
[52] U.S. Cl. .................................... 264/343; 264/345; 264/348
[58] Field of Search ................... 264/320, 331.19, 343, 264/345, 346, 348

[56] References Cited
U.S. PATENT DOCUMENTS
3,966,686 6/1976 Asakura et al. ...................... 528/331

Primary Examiner—Leo B. Tentoni
Attorney, Agent, or Firm—Sixbey, Friedman, Leedom & Ferguson

[57] ABSTRACT

A film molding apparatus and molding method wherein a gel state film is immersed in a vessel of a film supply unit. The film contains at least 50 weight % swelling agent relative to a polymer constituting the film. The vessel is filled with soaking liquid which acts so as not to destroy a swelling condition of the film caused by the swelling agent. Specifically, the molding method includes the steps of providing the above-noted film, heating a mold press die used for molding the film, press-molding the film in the press die and substantially drying the film by evaporating the swelling agent.

8 Claims, 10 Drawing Sheets

FILM MOLDING METHOD

BACKGROUND OF THE INVENTION

1. Field of the Invention

The present invention relates to a film molding apparatus and method, and more particularly to a film molding apparatus and method capable of molding a para orientation type aramid film at deep drawing.

The term "para orientation type aramid herein used throughout the specification means a polymer of a repetition structure wherein a para position or equivalent position of an aromatic ring is replaced with an amido radical.

2. Description of the Related Art

The following three methods are known for deforming a thermoplastic film with metal dies and thermally setting it. The first method is a vacuum molding method. With the second method, a film is first clamped with heated metal dies and thereafter it is molded by cooling the metal dies. With the third method, a film is first heated and thereafter it is clamped and molded with low temperature metal dies.

The first vacuum molding method will be described with reference to FIG. 13.

Figure 13A:
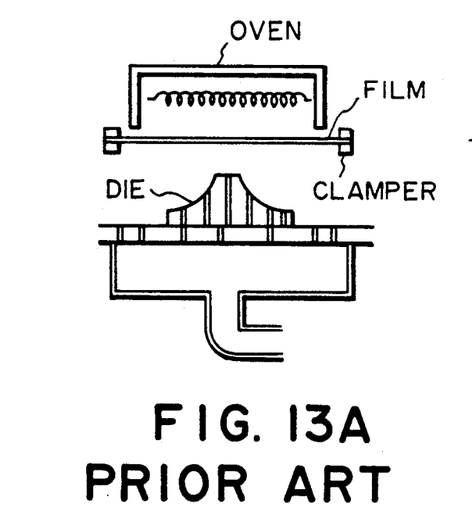
FIGS. 13(A), (B) and (C) are cross sections illustrating a conventional technique.

As shown in FIG. 13(A), a film pulled out of a roll is clamped by a clamper and heated near at an oven.

Figure 13B:
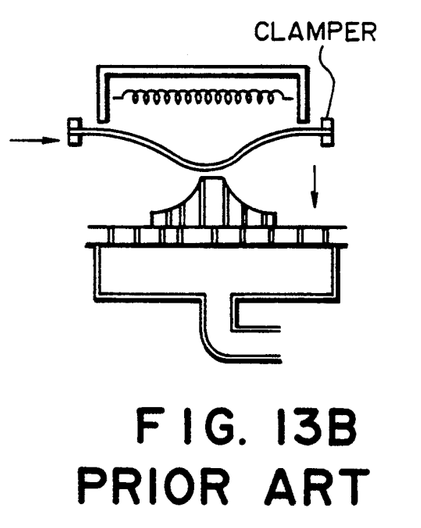

After the film is heated and softened, the clamper goes down to make the film in contact with a metal die, as shown in FIG. 13(B).

Figure 13C:
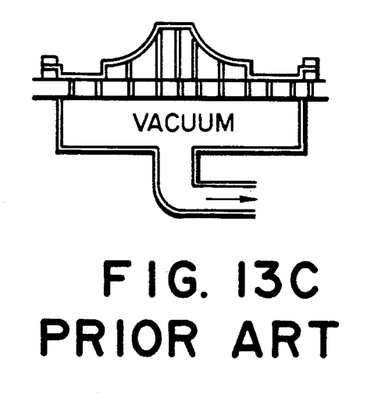

Next, as shown in FIG. 13(C), air is sucked via holes extending from the surface to the back of the metal die so that the film is cooled by the metal die. During the cooling operation, the oven is retracted so as not to heat the film.

After the film takes a strength retaining the shape of the metal die, the film or metal die is moved to detach the film from the metal die.

Figure 14A:
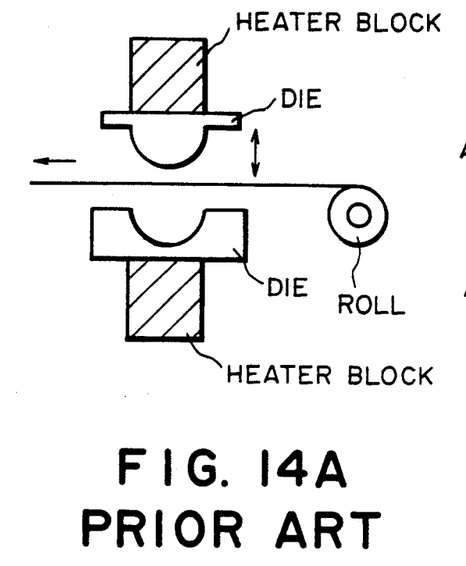
FIGS. 14(A), (B) and (C) are cross sections illustrating another conventional technique.
Figure 14B:
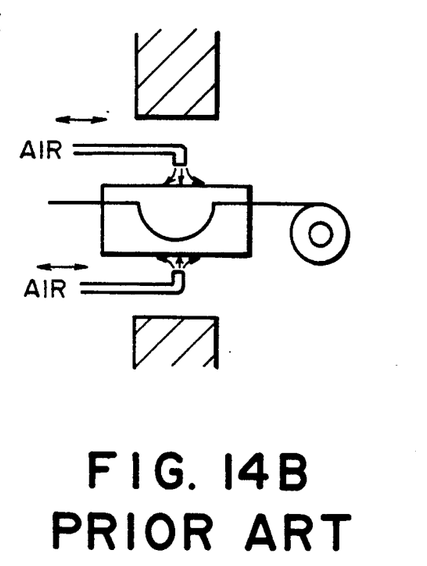
Figure 14C:
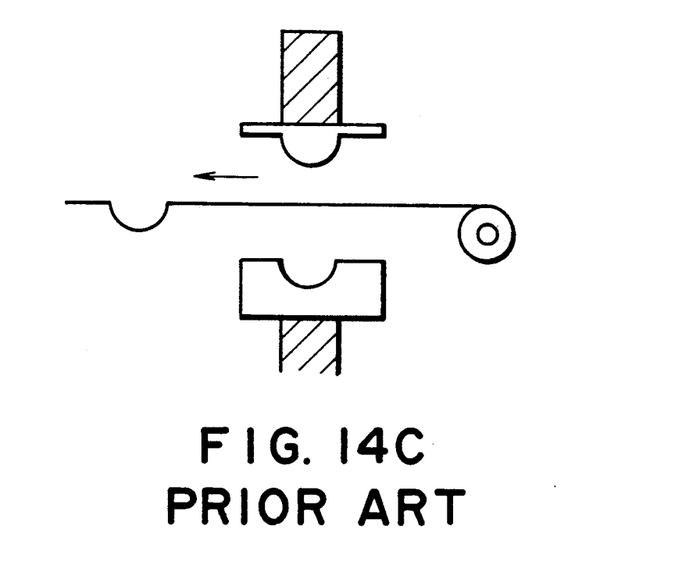

Referring to FIG. 14, there will be described the second method of clamping a film with heated metal dies and thereafter cooling the metal dies to mold the film.

As shown in FIG. 14(A), a film is pulled out of a roll and transported between metal dies. The upper and lower metal dies are pressed against heater blocks to heat the metal dies.

As shown in FIG. 14(B), the heated upper and lower metal dies go down to clamp and mold the film. Thereafter, nozzles are disposed at the back of the metal dies to cool both the metal dies and film with air. As shown in FIG. 14(C), after the film takes a strength retaining the shape of the metal dies, the metal dies are moved to detach the film therefrom.

Figure 15A:
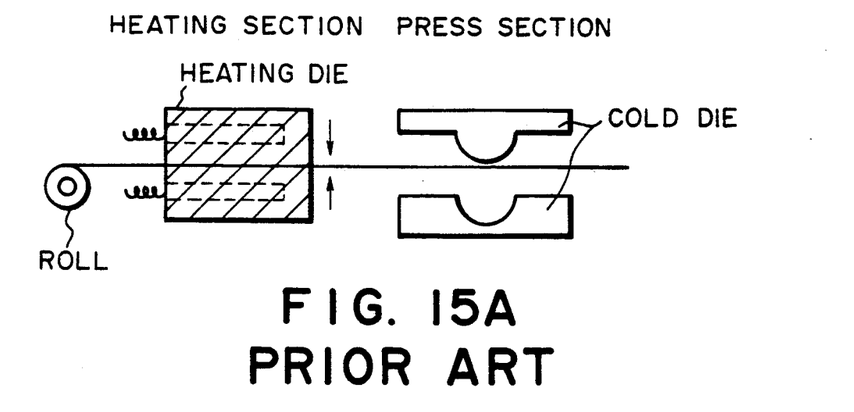
FIGS. 15(A), (B) and (C) are cross sections illustrating still another conventional technique.

Referring to FIG. 15, there will be described the third method of heating a film and thereafter clamping the film with low temperature metal dies to mold the film. As shown in FIG. 15(A), an apparatus for this method has heating and pressing sections juxtaposed each other. A film pulled out of a roll is clamped with heating metal dies at the heating section so that it is heated and softened.

Figure 15B:
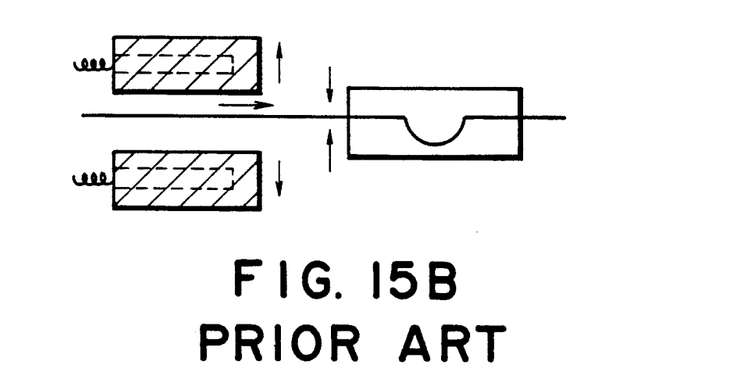

As shown in FIG. 15(B), the softened film is transported to the next pressing section and clamped and molded with metal dies so that the film is cooled and takes a strength retaining the shape of the metal dies.

Figure 15C:
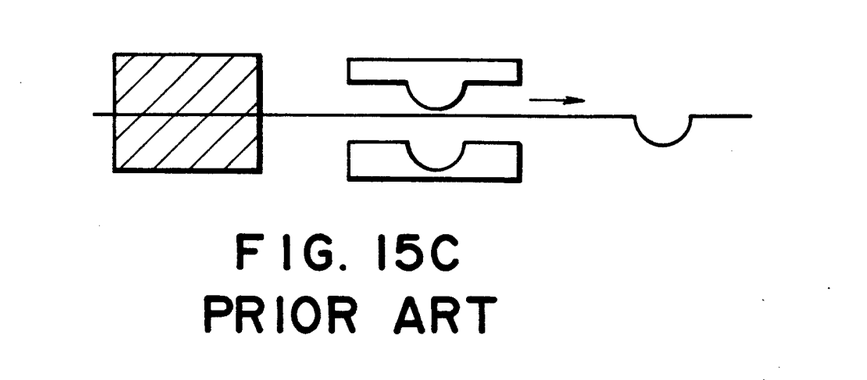

Next, the metal dies are moved to detach the film therefrom. The film is then transported to pick up the molded portion and heat the next film portion to be molded.

The above conventional molding methods are suitable for use in molding a thermo plastic film having a low softening point and being likely to have a stable shape after cooling.

However, a para orientation type aramid has a very high glass transition point and softening point. Therefore, the above-described conventional methods cannot mold such a film at deep drawing.

The first vacuum method in particular cannot such an aramid film toward a metal die if the film is not softened sufficiently, thereby disabling to mold the film.

The second and third methods can mold such a film only at shallow drawing. If such a film is molded at deep drawing, it may sometimes be broken during pressing, or it may sometimes change with time its shape because of a residual stress at the time of molding.

With the second method in particular, the metal dies are not heated during pressing so that the temperature control during pressing is difficult. With the third method, the upstream and downstream of a pressed portion of the film may be deformed, resulting in a low manufacturing yield.

SUMMARY OF THE INVENTION

The present invention has been made to solve the above problems. It is an object of the present invention to provide a film molding apparatus and method capable of molding an aramid film into a shape of high degree of freedom while retaining a good yield.

According to the present invention, a para orientation type aramid film is immersed in a vessel of a film supply section after washing out solvent at the manufacturing process and without drying, the film being maintained so as to contain at least 50 weight % swelling agent relative to a polymer constituting the film. Soaking liquid is filled within the vessel so as not to destroy such a swelling condition of the film. In this condition, the film is cut into film pieces each corresponding to one molding product, and sequentially supplied to a mold press. This mold press clamps and molds a film piece with metal dies. Thereafter, heater blocks are pressed against the metal dies to heat the metal dies so that the film piece is maintained at a predetermined temperature and thermally set. Next, cooling blocks are pressed against the metal dies to cool the metal dies and hence the film piece. Then, the film piece having an increased strength is detached from the metal dies.

As the para orientation type aramid, a polyphenylene terephtahlate amido (hereinafter called PPTA) is most preferable. Depending upon application fields, a copolymer may be used, for example, m-phenylene, 4, 4-diphenylene, 1, 4-naphthalene, 1, 5-naphthalene, 2, 6-naphthalene, 4, 4-diphenylene, 3, 4-diphenylene ethylene, or a substitutional group of these copolymers replaced with halogen, alkyl, nitro and the like. A polybensamido may also be used.

If the polymerization degree of a para orientation type aramid is too low, a film sheet having excellent mechanical characteristics cannot be obtained. Preferably, a polymerization degree is selected which provides a logarithmic viscosity coefficient $\eta$ inh 3.5 or higher, or more preferably 4.5 or higher. The logarithmic viscosity coefficient is a value measured at 30° C. with a polymer of 0.5 g dissolved into high concentration sulfuric acid 100 ml.

As the swelling agent for maintaining a para orientation type aramid, there are, for example, water, dimethylsulfoxide (DMSO), reethanol, alkali aqueous solution, metal base aqueous solution, a mixture thereof, and the like.

According to the present invention, a para orientation type aramid film contains swelling agent and is maintained in a gel state at the time of pressing. Therefore, the film can be easily molded by pressing with metal dies. The film is maintained at a predetermined temperature for a predetermined time period while being pressed with the metal dies. Therefore, it is possible to obtain a molded product thermally set and having a stable dimension.

In general, a para orientation type aramid is difficult to be swelled once it is dried and crystallized. According to the present invention, a para orientation type aramid is supplied to a mold press without drying it so that it can be easily molded.

BRIEF DESCRIPTION OF THE DRAWINGS

FIG. B(A) is a plan view of a die setting plate of the mold press.

DETAILED DESCRIPTION OF THE EMBODIMENT

A preferred embodiment of the present invention will be described with reference to the accompanying drawings. This embodiment is intended to be used for manufacturing a speaker diaphragm integrally formed with a diaphragm unit, voice coil bobbin unit, and suspension unit, by using a PPTA film. An excellent performance speaker diaphragm can be obtained because of high rigidity and high heat resistance of PPTA and because of non-use of adhesive agent.

Figure 1:
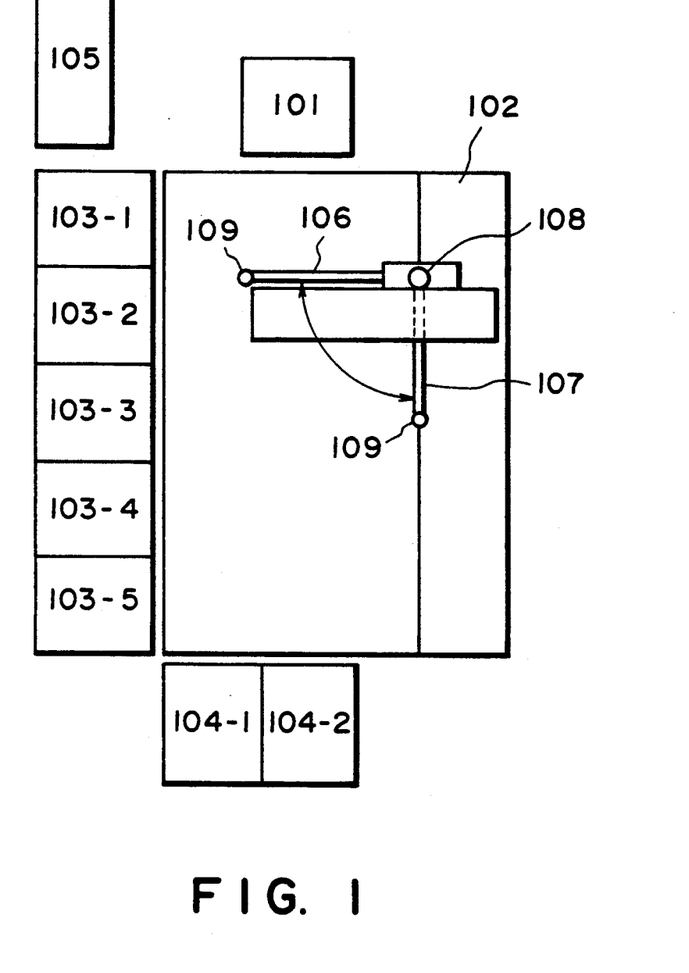
FIG. 1 is a schematic diagram showing the overall layout of a film molding apparatus according to an embodiment of the present invention.

FIG. 1 shows the overall layout of the film molding apparatus according to the embodiment of the present invention.

As shown in FIG. 1, the apparatus is constructed of a material supply section 101 for supplying a PPTA film, an X, Y orthogonal robot 102 for transporting material and intermediate products, five mold presses, 03-1, ..., 103-5, two punching press sections 104-1 and 04-2, and a control 105 box for controlling these elements.

The X, Y orthogonal robot has a film pickup arm 106 and a molded product pickup arm 107. The film pickup arm is used to pickup film pieces from the material supply section, and supply them to one of the mold presses. The molded product pickup arm is used to pick up a molded film piece from the mold press, and supply it to one of the punching press sections. Both the arms ar moved up and down and rotated by lifts and rotary actuators 108. The arms are moved in the X-Y direction together with the rotary actuators so that a film piece sucked with a suction pad 109 mounted at each arm end can be transported.

Figure 2:
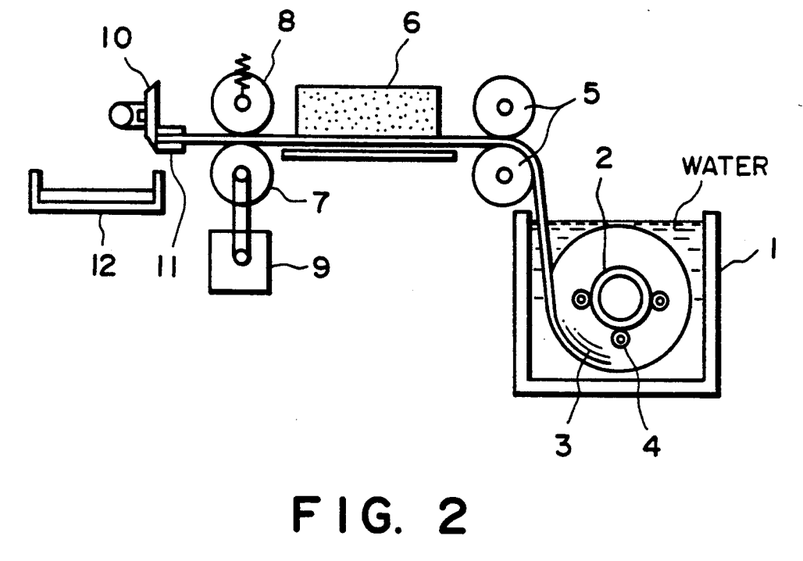
FIG. 2 is a cross section showing the main part of a material supply section of the embodiment shown in FIG. 1.

FIG. 2 is a cross section of the material supply section.

In FIG. 2, reference numeral I represents a water vessel in which water serving as swelling agent is filled.

A molding material immersed in the water vessel 1 is a PPTA film 3 of a gel state.

This film 3 was made in the following manner. PPTA having $\eta$ inh 5.2 was dissolved within 99.5% high concentration sulfuric acid to obtain 12% concentration. There was obtained at 65° C. a dope of 8200 poises having optical anomaly. After desiring and filtering, the dope was caused to drain via a die having a slit of 0.30 mm × 300 mm onto a belt made of tantalum. Air at about 100° C. and having a relative humidity of about 30% was blown to the flowing dope to change it into a transparent dope having an optical isotropy. The dope was then introduced into low concentration sulfuric acid to coagulate it.

The coagulated film sheet was peeled off from the belt, and sequentially washed by using water at a room temperature, 0.5% sodium hydrosulfite aqueous solution, and water at about 30° C. to 40° C., in this order recited. The obtained film sheet was a gel film having a thickness of about 250$\mu$, a tensile strength of about 100% at a room temperature, and a high moisture content.

The film was cut with a slitter and wound about a bobbin. In this condition, the film was immersed within the water vessel 1.

Figure 3:
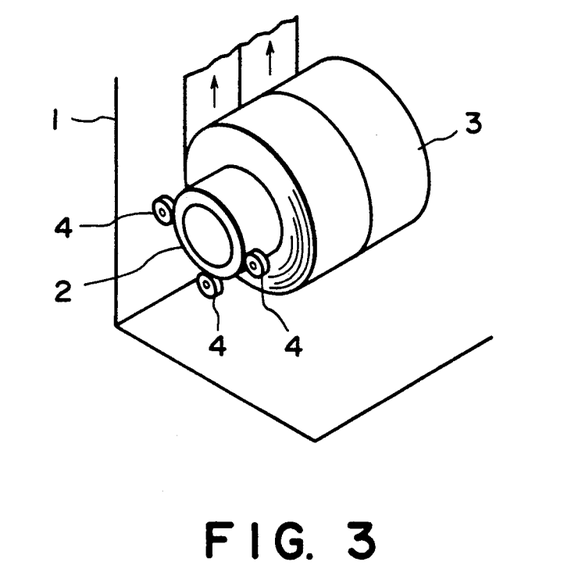
FIG. 3 is a partial perspective view of the material supply section.

As shown in FIG. 3, the bobbin 2 about which the film was wound is rotatably supported by two sets of three rollers 4 mounted at the right and left sides of the water vessel.

The gel film 3 is guided by guide rollers 5, becomes in contact with a pad 6, and pulled out by a pressure roller 8 and a feed roller 7.

The feed roller 7 is intermittently driven by a motor 9 to feed by a predetermined length. The fed film is cut by a rotary blade 10 driven in the vertical direction as viewed at the drawing surface and by a fixed blade 11. The cut film falls down to a film receptor 12.

Water on the surface of the film is wiped out by the pad 6 so that the water contents become uniform over the surface, while wiping out the water contents to the extent that cut film sheets do not attach together.

Figure 4:
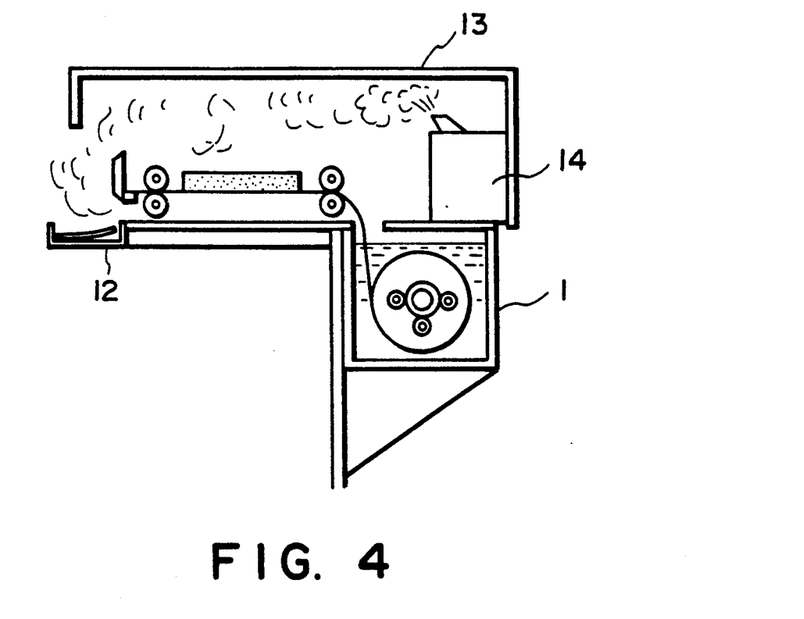
FIG. 4 is a cross section showing the outline of the material supply section.

In order not to dry the film pulled out of the water vessel and fallen on the film receptor 12, the upper portion of the region from the vessel 1 to the film receptor 12 is provided with a cover 13 as shown in FIG. 4. A humidifier 14 is provided to raise the air humidity of a space under the cover 13.

Figure 5A:
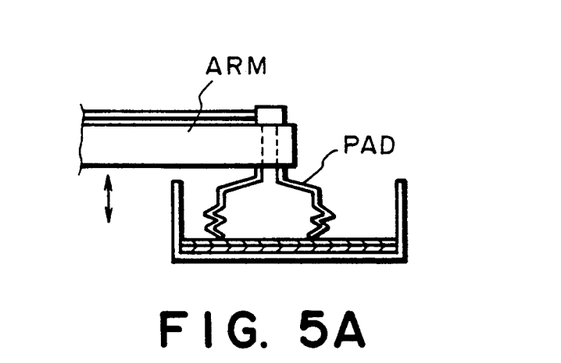
FIG. 5(A) and 5(B) are cross sections showing a film reception unit of the material supply section.
Figure 5B:
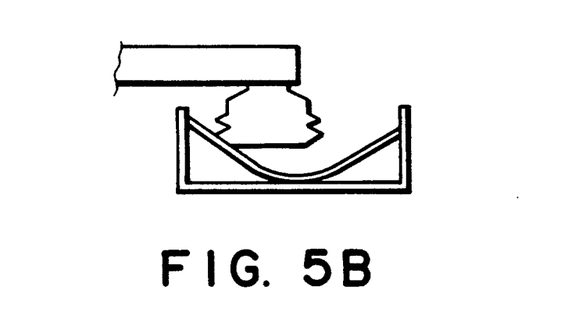

FIG. 5 illustrates how a film piece on the film receptor is picked up by the suction pad of the robot. FIG. 5(A) illustrates a normal state.

FIG. 5(B) illustrates an abnormal operating state of the suction pad because the film piece was dried and curled. This state results from non-use of means such as the cover 12 for preventing water on the film surface being evaporated.

If there is not provided the means for preventing water on the film surface from being evaporated, it becomes difficult to correctly supply a film piece to the mold press. Furthermore, the gel state of the film is destroyed, resulting in the difficulty of the molding operation by the mold press.

Figure 6:
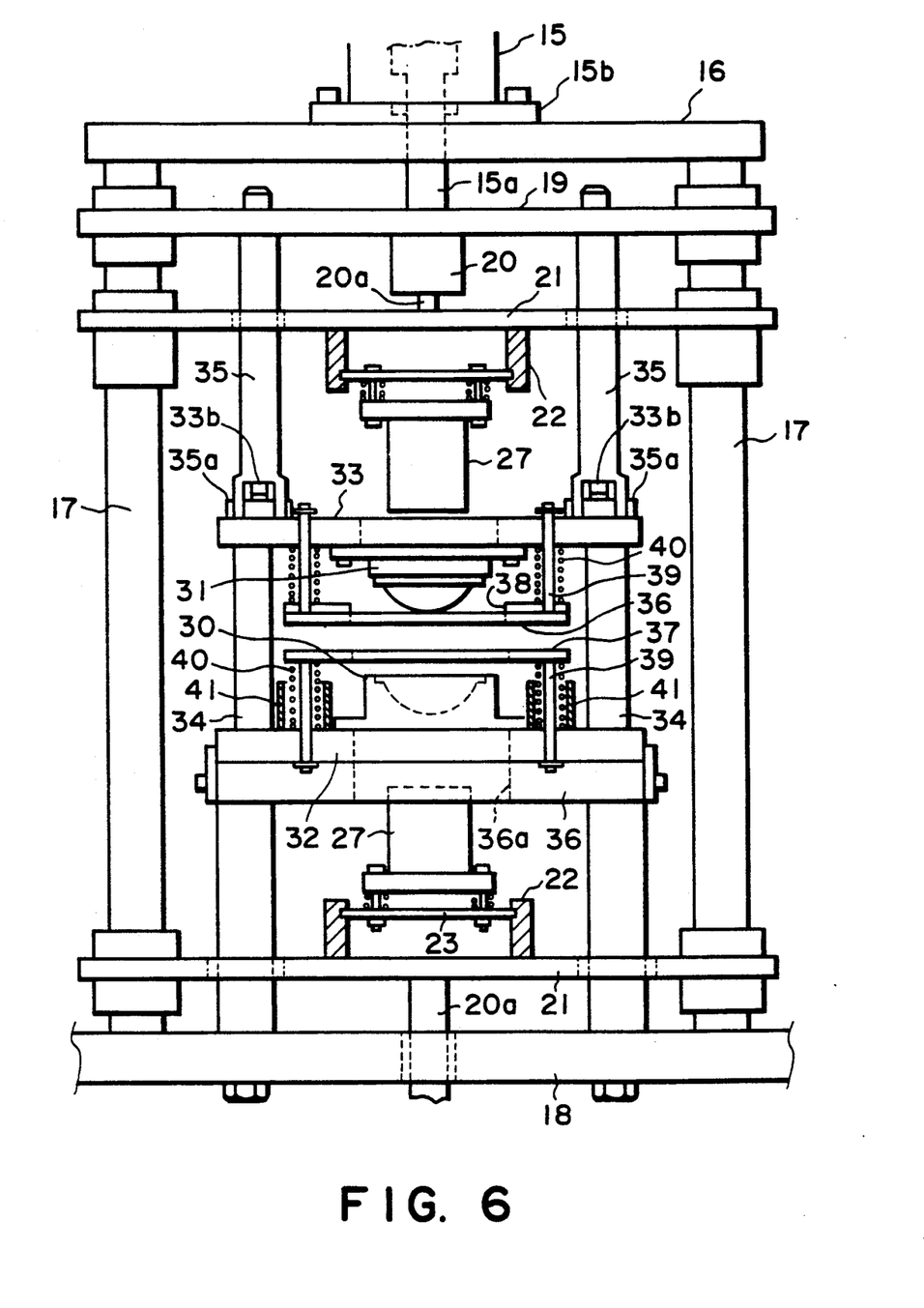
FIG. 6 is a cross section showing the main part of a mold press of the film molding apparatus of the embodiment shown in FIG. 1.

The mold press section is constructed by five mold presses one of which is shown in FIG. 6.

The mold press is constructed of molding die raising/lowering mechanisms, heater blocks, cooling blocks, block sliding mechanisms, block raising/lowering mechanisms, and poles and base plates for supporting these elements.

The molding die lifting mechanism is driven by air cylinders 15.

Poles 17 are mounted upright on a main base 18. A cylinder mounting plate 16 is fixed to the ends of the poles 17.

The air cylinder 15 is fixedly mounted on the cylinder mounting plate 16. At the end of a cylinder rod 15a of the air cylinder 15, a base 19 is mounted slidable with respect to the poles 17.

The base 19 is mounted with an air cylinder 19 for raising and lowering a die, the heater block 17, and the cooling block 18.

In order to control the die raising/lowering speed at two steps, the cylinder rod 15a is formed stepwise. A cylinder plate 15b is formed with a stepwise hole corresponding to the cylinder rod 15a, with an air cushion chamber being formed. Air in the air cushion chamber is expelled outward via a needle valve.

Figure 7A:
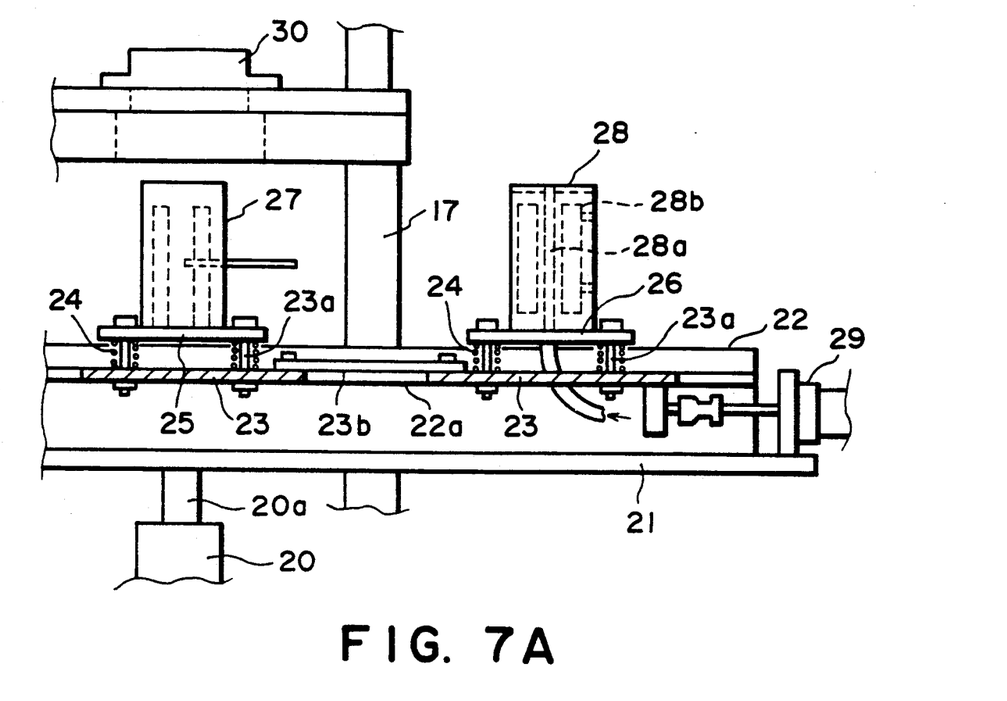
FIG. 7(A) is a partial cross section of the mold press.

The heater blocks 27 and cooling blocks 18 are mounted under and above the dies, the blocks under a die being shown in FIG. 7(A).

The block raising/lowering mechanisms and block sliding mechanism under a die will be described with reference to FIG. 7(A).

A base 21 is slidably mounted on the poles 17. the base 21 is coupled to the end of a cylinder rod 20a of the air cylinder 20 which is fixed to the main base, so that the base 21 is moved up and down by the air cylinder 20. The upper base 21 is driven, however, by the air cylinder 20 mounted on the base 19 as described previously.

A slide rail 22 with a groove 22a is fixed to the base 21. The groove 22a engages with slide plates 23 which are coupled to a rod 23b.

One of the slide plates 23 is coupled to a rod of the air cylinder 29 fixed to the base 21. The slide plates 23 are driven by the air cylinder 29 in the horizontal direction.

The slide plates 23 support heat insulating plates 25 and 26 via pins 23a such that the heat insulating plates can move up and down. The heat insulating plates 25 and 26 are biased upward by springs 24, and made of heat insulating material such as asbestos or ceramics on which the heater block 27 or cooling block 28 is fixedly mounted.

The heater block 27 is embedded with a temperature sensor and a nichrome wire so that it is heated to a predetermined temperature.

The cooling block 28 is formed with an air communication hole 28s at the center thereof, and with a void 28b having an air inlet/outlet.

Figure 7B:
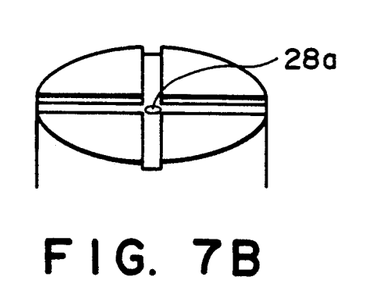
FIG. 7(B) is a perspective view showing the upper portion of a cooling block of the mold press.
Figure 7C:
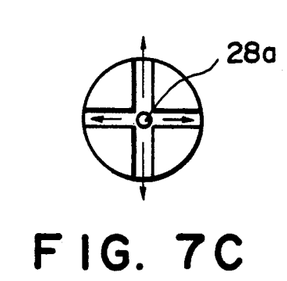
FIG. 7(C) is a plan view of the cooling block of the mold press.

As shown in FIGS. 7(B) and (C), the air communication hole 28a is exposed within a cross groove formed in the upper end portion of the cooling block.

Figure 7D:
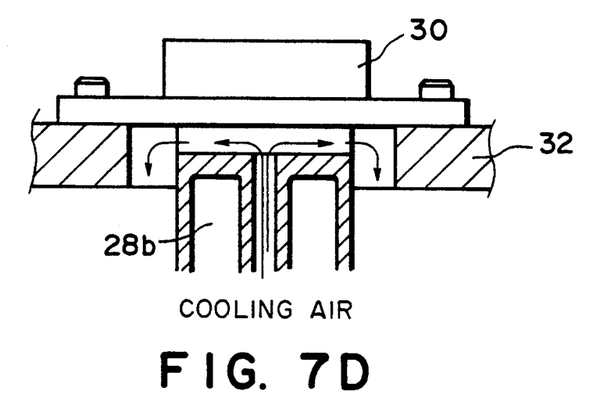
FIG. 7(D) is a cross section of the cooling block of the mold press.

When the heater block 27 and cooling block 28 are raised by the air cylinder 20, they are pressed to the back of a lower die 30 to heat and cool the die. As shown in FIG. 7(D), the lower die 30 is also cooled by air flowing through the cross groove of the cooling block 28.

As shown in FIG. 6, the lower die 30 and upper die 31 are fixed to lower and upper die setting plates 32 and 33, respectively.

Figure 9:
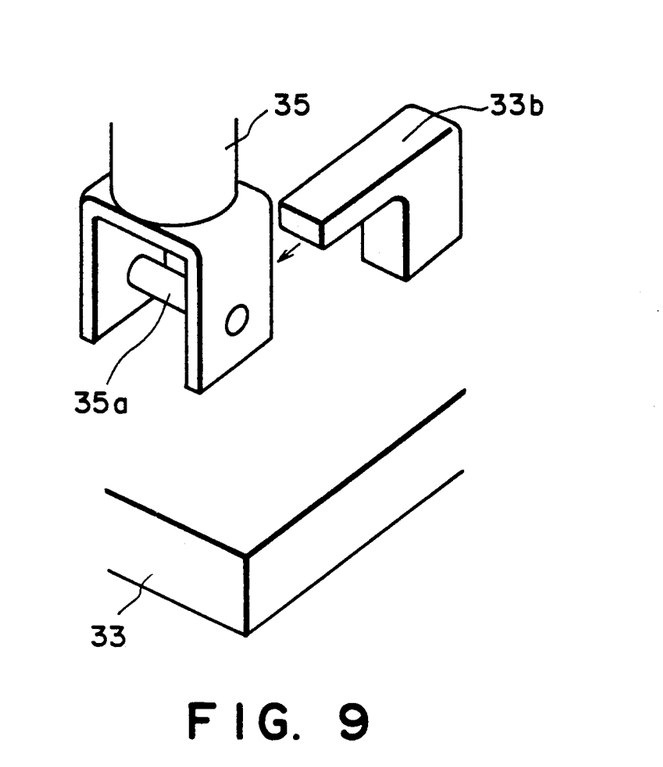
FIG. 9 is a perspective view showing the upper portion of the die setting plate of the mold press.

The upper die setting plate 33 is slidably supported by a die setting pole 34 mounted upright on the lower die setting plate 32. The upper die setting plate 33 is moved up and down by a rod 35 mounted upright on the base 19. Specifically, as shown in FIG. 9, a hook 33b mounted on the upper die setting plate 33 engages with a pin 35a fixed to the end of the rod 35.

Figure 8A:
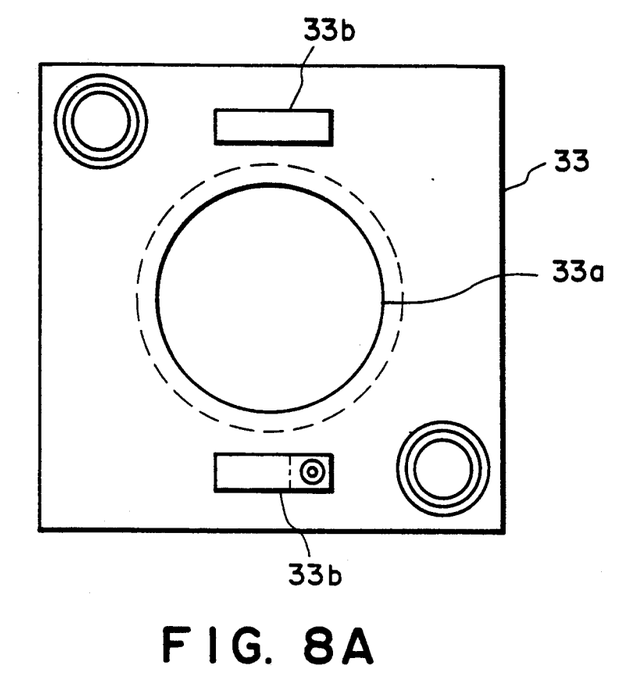
Figure 8B:
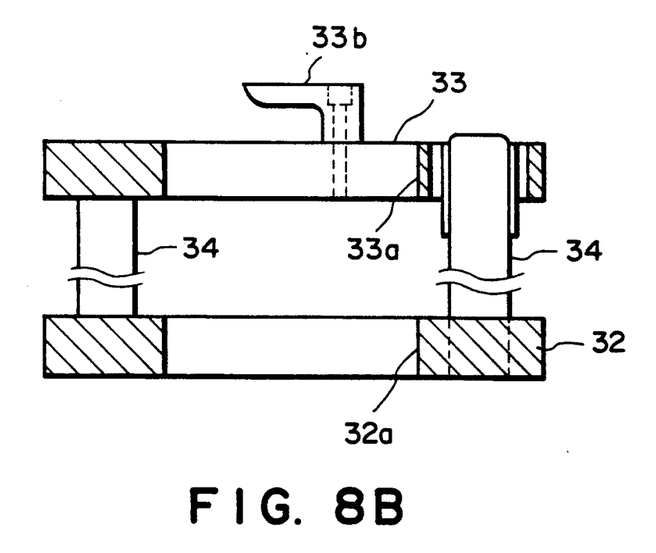
FIG. 8(B) is a cross section of a die setting plate of the mold press.

As shown in FIG. 8(A) and (B), the upper and lower die setting plates 33 and 32 are formed at the center thereof with holes 33a and 32a through which the heater block and cooling block go in and out. The upper dies are set covering the holes.

A pair of the upper and lower die setting plates mounting the metal dies is squeezed at a die mounting base 45 as shown in FIG. 6. The die mounting base 45 is also formed with a hole 45a through which the heater block and cooling block go in and out.

As shown in FIG. 6, upper and lower pressure rings 36 and 37 for holding a film are supported in a floating state by the upper and lower die setting plates 33 and 32.

Specifically, shafts 39 are mounted upright on the pressure rings 36 and 37. The shafts 39 are fitted in the holes of the die setting plates 33 and 32. The pressure rings 36 and 37 are biased by springs 40.

Stoppers 41 for regulating a stroke of the pressure ring 37 are mounted on the lower die setting plate 32.

A sheet heater 38 with a temperature sensor is fixedly attached to the upper pressure ring 36.

Figure 10:
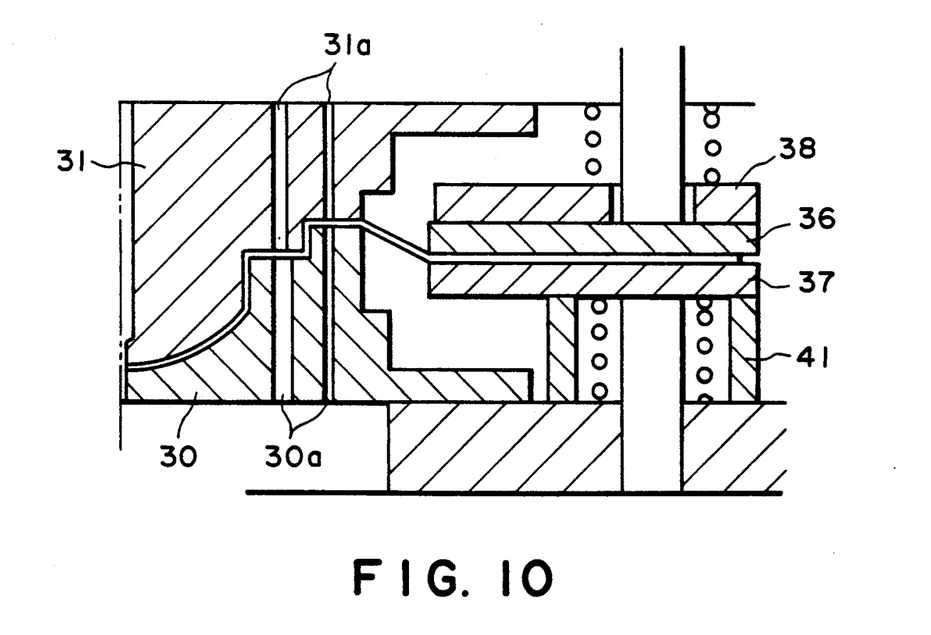
FIG. 10 is a cross section of a die of the mold press.

As shown in FIG. 10, the lower and upper metal dies 30 and 31 are formed with respective holes 30a and 31a extending from the pressing surfaces to the back surfaces.

One or two holes are generally formed in a metal die to escape air in a closed space defined by a pair of upper and lower metal dies. In this embodiment, eight holes are formed to escape vapor generated when a film is heated.

Figure 11:
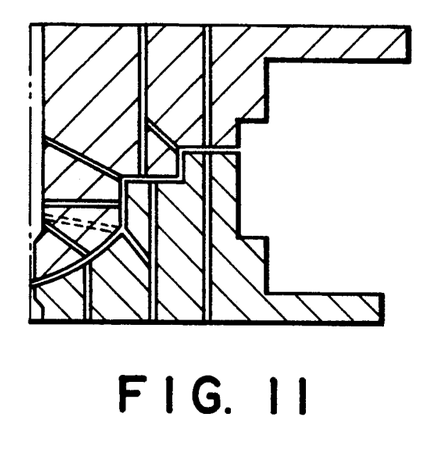
FIG. 11 is a cross section showing a modification of the die of the mold press.

FIG. 11 shows a modification of dies wherein holes extend toward the ridge of dies so that vapor can escape more easily.

In this embodiment, two punching sections are provided to form a hole in a molded film or punching out an unnecessary portion.

The robot is an orthogonal type robot movable 1500 mm on the X axis and 450 mm on the Y axis for transporting a film between the material supply section, mold press, and punching section.

The film pickup arm and molded product pickup arm are mounted spaced by 90 degrees. The arms are integrally moved up and down by a lift, and are rotated by 90 degrees by a rotary actuator. At each end of the arms there is mounted a suction pad for sucking film.

An example of a film molded by the film molding apparatus constructed as above will be described.

As the molding material, PPTA films having a thickness of 250 and a width of 75 mm were wound in two rows about a bobbin to obtain a roll of films.

This film roll was maintained so as not to become dry, and immersed in the water vessel 1. The ends of the films were pulled out from the water vessel and set to the material supply section. Thereafter, the upper heater block of the mold press was set to 430° C. to 450° C., and the lower heater block to 510° C. to 550° C.

When the above-described temperatures were set, the film molding apparatus was subject to a run-in for about 30 minutes without supplying films so as to stabilize the temperatures of metal dies. Thereafter, the film molding apparatus was caused to enter an automatic operation.

Films were fed by 75 mm, and cut into film pieces. One cutting operation provides two square film pieces having a thickness of 250 $\mu$ and a slide length of 75 mm, the film pieces being sent to the film receptor.

Each film piece is picked up by the robot film pickup arm, and transported onto the pressure ring 37 under the condition that the metal dies are separated.

At this time, the temperatures of the metal dies were about 130° C. to 140° C.

Next, the air cylinder 15 for raising/lowering the die starts lowering. During this period, the robot supplies film pieces to the other four mold presses.

The gel film piece on the pressure ring is likely to emit water contents and deform because of radiated heat from the heater block, dies and the like. It is therefore preferable that the pressure ring is positioned as far as possible from the dies, and that the die lowering speed is as fast as possible until the film piece is squeezed by the pressure ring.

However, a molding speed suitable for the gel film piece is used for a molding operation. In the case of the gel PPTA film used in this embodiment, the lower the molding speed, the deeper the drawing was possible under the room temperature condition.

Accordingly, it is preferable to control the cylinder speed by two steps. In this embodiment, the cylinder lowering speed before the film piece is squeezed by the pressure ring was set to 150 to 200 mm/sec by a speed controller mounted at the air inlet/outlet. The speed after clamping the film piece, i.e., the molding speed, was set to 0.8 to 1 mm/sec by an air exhaust needle valve in the air cushion chamber.

The pressure applied to the metal dies was set to 12 to 13 kg/cm$^2$.

While the metal dies press the film piece or before that time, the air cylinders 20 for raising/lowering the upper and lower blocks operate to lower the upper heater block 27 and raise the lower heater block 27, so that they tightly press the upper and lower metal dies which are then heated.

When the temperature of the male or upper metal die reaches 330° C. to 350° C. and that of the female or lower metal die reaches 360° C. to 380° C., the air cylinders 20 for raising/lowering the upper and lower blocks operate to move the heater blocks 27 away from the metal dies.

When the heater blocks 27 return to the initial positions, the air cylinders 29 operate to slide the cooling blocks 28 at the positions corresponding to the metal dies, and slide the heater blocks outside of the die setting plates.

Next, the air cylinders 20 for raising/lowering the upper and lower blocks operate to lower the upper cooling block 28 and raise the lower cooling block 28, so that they tightly press the upper and lower metal dies. Air is then ejected out from the air outlet to cool the metal dies.

The metal dies are cooled to such a temperature not allowing a deformation of the film piece when it is detached from the metal dies. Then, the metal die raising air cylinder 15 rises to separate both the dies. At the same time, the cooling blocks are separated from the dies and return to the initial positions.

In this embodiment, before the film piece is detached from the metal dies, the male metal die is cooled down to 140° C. to 150° C. and the female metal die is cooled down to 150° C. to 160° C.

A gel PPTA film piece is molded by the above processes. It is preferable to set the heating temperature to 330° C. or higher, or more preferably 350° to 380° C., so as to obtain a molded product having stable mechanical characteristics and dimension.

In order to shorten a molding cycle, it is advantageous if the temperatures of the metal dies before pressing are set as high as possible. However, if the temperature is set to 200° C. or higher, water contents evaporate near from the film surface immediately when the metal dies become in contact with the film piece. Therefore, the molded product has a solid portion only near the surface and void vapor within the product, resulting in a poor product quality. In view of this, in this embodiment the temperatures of the metal dies before pressing is preferably set to 190° C. or lower. The temperatures depend on the thickness of the gel PPTA film. For example, the temperatures may be set about 220° C. for a film thickness of 75$\mu$. The molded film piece is transported to the punching section by the robot. One punching press punches out holes, and the other punching press cuts out unnecessary portions of the product.

Figure 12:
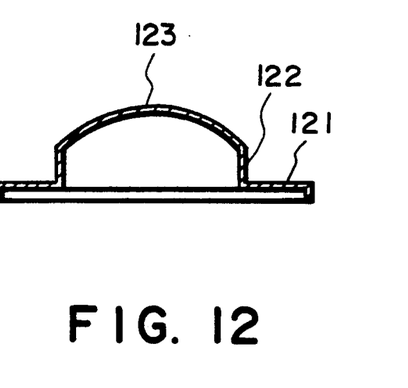
FIG. 12 is a cross section showing a speaker diaphragm molded by using the embodiment apparatus.

The configuration of a speaker diaphragm molded according to the embodiment is shown in FIG. 12.

In FIG. 12, the diameter of the outer periphery of the flange is 35 mm, and the height of the flange is 1.5 mm.

The cylindrical section is formed inside the flange, this section has a diameter of 25 mm and a height of 3 mm. A dome about 4 mm is formed on the top of the cylindrical section. Six holes of 6 mm diameter are formed in the flange at equal radial intervals to adjust the compliance. The flange is used as a suspension, the cylindrical section is used as a coil bobbin, and the dome is used as a sound radiating source. This speaker diaphragm is constructed of an integrated combination of a suspension, coil bobbin, and diaphragm, having a reduced number of manufacturing processes, and a high Young's modulus allowing reproduction up to a high frequency range.

As described so far, according to the present invention, it is possible to mold a PPTA film at deep drawing which has been heretofore impossible. By applying the present invention to a speaker diaphragm, it becomes possible to obtain a speaker diaphragm integrally formed with diaphragm, coil bobbin, and suspension.

Since a PPTA film has a high elastic modulus and no adhesive agent is used, it is possible to obtain a diaphragm of small mass and high rigidity, thereby providing high frequency reproduction. Furthermore, since the film has a high heat resistance, a high input power diaphragm can be obtained. For the molding operation, a roll film is not supplied to a mold press, but a film piece corresponding to one molding product is supplied. Accordingly, heat to be applied to a film piece from the mold press can be restrained minimum so that it is possible to prevent swelling agent from escaping from the film piece, and hence deformation of the film can be prevented. A stable quality and high yield of products can thus be ensured. Furthermore, it is possible to precisely determine positions where a punching process is executed later. The metal dies are heated by heater blocks and cooled by cooling blocks, so that a heating and cooling time is made short and the temperature can be controlled precisely. The pressure ring is mounted on the die setting plate in a floating state, and the temperature of the pressure ring is made controllable. Accordingly, the clamping time of the molded film can be made longer after the metal dies are separated, and the evaporation of water contents on the molded film at the clamped portion can be made uniform, resulting in a uniform shape of the molded product. More holes are formed in the metal dies than conventional so that water contents can be easily escaped from the film piece, resulting in a stably molded product.

The film molding apparatus and method of the present invention is applicable not only to a PPTA film containing water as swelling agent, but also to other films such as a polyimide film containing swelling agent. It can be easily understood that the present invention is effectively applied also to other films susceptible to thermal deformation, particularly in the form of roll film, such as films made of or containing thermo-setting resin including epoxy resin, bismaleide resin and the like.

What is claimed is:

1. A film molding method comprising the steps of:

providing a gel state film which contains at least 50% swelling agent relative to a matrix polymer and immersing said gel state film in a vessel filled with soaking liquid to keep the swelling agent in the film;

heating a mold press die used for molding the gel state film and delivering the gel state film to the die from the vessel;

press-molding the gel state film with the heated mold press die, maintaining the film in a gel state at the time of press-molding, and substantially drying the gel state film by evaporating the swelling agent in the film while maintaining the press-molding; and removing the press-molding film from the die after drying the film.

2. A film molding method according to claim 1, wherein said polymer is para orientation type aramid resin.

3. A film molding method according to claim 2, wherein said para orientation type amid has a polymerization degree selected so that a logarithmic viscosity coefficient $\eta$ inh is larger than 3.5.

4. A film molding according to claim 2, wherein said heating step heats the die at about 180° C.–220° C. prior to the press-molding.

5. A film forming method according to claim 2, wherein said removing step cools the press-molded film below about 160° C. and then removes the press-molded film from the die.

6. A film molding method according to claim 1, wherein said swelling agent is one selected from the group consisting of water, dimethyl sulfoxide, methanol, alkali aqueous solution, metal base aqueous solution and mixtures thereof.

7. A film molding method according to claim 1, wherein swell agent vapor is applied to said gel state film while the gel state film is being delivered to the die.

8. A film molding method according to claim 1, wherein said polymer is polyphenylene terephthalate amido.

* * * * *

UNITED STATES PATENT AND TRADEMARK OFFICE
CERTIFICATE OF CORRECTION

PATENT NO. : 5,273,705

DATED : December 28, 1993

INVENTOR(S) : Yoshio SAKAMOTO

It is certified that error appears in the above-identified patent and that said Letters Patent is hereby corrected as shown below:

On title page, item

[73] Assignees: Kabushiki Kaisha Kenwood, Tokyo, Japan and Goto Denshi Co., Ltd., Yamagata, Japan Signed and Sealed this Thirty-first Day of January, 1995

BRUCE LEHMAN

*Attest:*

*Attesting Officer*   *Commissioner of Patents and Trademarks*